(12) United States Patent
Winner et al.

(10) Patent No.: US 9,769,122 B2
(45) Date of Patent: Sep. 19, 2017

(54) ANONYMOUS SINGLE SIGN-ON TO THIRD-PARTY SYSTEMS

(71) Applicant: Facebook, Inc., Menlo Park, CA (US)

(72) Inventors: Caitlin Rothrock Winner, San Francisco, CA (US); James J. Yu, San Francisco, CA (US); Tirunelveli R. Vishwanath, Sunnyvale, CA (US); Christophe Marcel Rene Tauziet, San Francisco, CA (US); David Eitan Poll, Mountain View, CA (US); Mark Ginga Misawa Duppenthaler, Menlo Park, CA (US); Ling Bao, San Mateo, CA (US)

(73) Assignee: Facebook, Inc., Menlo Park, CA (US)

( * ) Notice: Subject to any disclaimer, the term of this patent is extended or adjusted under 35 U.S.C. 154(b) by 38 days.

(21) Appl. No.: 14/471,313

(22) Filed: Aug. 28, 2014

(65) Prior Publication Data
US 2016/0065541 A1    Mar. 3, 2016

(51) Int. Cl.
*H04L 29/06* (2006.01)
*H04L 29/08* (2006.01)

(52) U.S. Cl.
CPC ...... *H04L 63/0421* (2013.01); *H04L 63/0815* (2013.01); *H04L 63/0807* (2013.01); *H04L 67/10* (2013.01)

(58) Field of Classification Search
CPC . H04L 63/0421; H04L 67/10; H04L 63/0851; H04L 63/0807
USPC .......................................................... 726/6
See application file for complete search history.

(56) References Cited

U.S. PATENT DOCUMENTS

| | | | | |
|---|---|---|---|---|
| 6,609,198 B1 * | 8/2003 | Wood | ...................... | G06F 21/31 713/155 |
| 6,740,873 B2 * | 5/2004 | Pusterla | .............. | C01B 23/0084 250/281 |
| 7,975,056 B2 * | 7/2011 | Gmuender | .............. | H04L 29/06 709/226 |
| 8,020,195 B2 * | 9/2011 | Frost | ...................... | G06F 21/31 709/227 |
| 8,688,813 B2 * | 4/2014 | Maes | ................ | H04L 29/12047 709/204 |
| 8,706,761 B1 * | 4/2014 | Jung | ................ | G06Q 10/06313 707/790 |

(Continued)

*Primary Examiner* — Hadi Armouche
*Assistant Examiner* — Shahriar Zarrineh
(74) *Attorney, Agent, or Firm* — Fenwick & West LLP

(57) ABSTRACT

An online system receives from a third-party application on a client device, an anonymous login request to anonymously log a user of the online system into a third-party system associated with the third-party application. Responsive to receiving the anonymous login request, the online system generates a permissions user interface (UI) that provides an interface component including an option for the user to anonymously log into the third-party system using the user's login information for the online system. The online system provides the permissions UI to the client device, and receives permissions information from the client device. The online system generates an anonymous identifier that allows the user to login to the third-party system. The online system provides the anonymous identifier to the third-party application to allow anonymous login of the user into the third-party system in accordance with the permissions information.

21 Claims, 7 Drawing Sheets

(56) References Cited

U.S. PATENT DOCUMENTS

| | | | | |
|---|---|---|---|---|
| 8,843,997 | B1* | 9/2014 | Hare | H04L 63/0281 709/200 |
| 9,117,058 | B1* | 8/2015 | Ansari | G06F 21/105 |
| 9,258,279 | B1* | 2/2016 | Rajkumar | G06F 17/2205 |
| 9,628,471 | B1* | 4/2017 | Sundaram | H04L 63/083 |
| 2001/0054155 | A1* | 12/2001 | Hagan | G06F 21/6254 713/193 |
| 2003/0172090 | A1* | 9/2003 | Asunmaa | G06F 21/31 |
| 2003/0188171 | A1* | 10/2003 | DeCenzo | H04H 60/33 713/185 |
| 2005/0154913 | A1* | 7/2005 | Barriga | G06F 21/33 726/4 |
| 2005/0216582 | A1* | 9/2005 | Toomey | H04L 63/0807 709/224 |
| 2006/0274896 | A1* | 12/2006 | Livesay | H04L 63/0421 380/255 |
| 2008/0201731 | A1* | 8/2008 | Howcroft | H04H 60/46 725/13 |
| 2009/0119763 | A1* | 5/2009 | Park | H04L 63/0815 726/8 |
| 2009/0171905 | A1* | 7/2009 | Garcia | G06F 17/30728 |
| 2009/0320101 | A1* | 12/2009 | Doyle, III | G06F 21/31 726/4 |
| 2010/0091763 | A1* | 4/2010 | Thompson | H04L 29/12132 370/352 |
| 2010/0325441 | A1* | 12/2010 | Laurie | G06F 21/31 713/185 |
| 2011/0047608 | A1* | 2/2011 | Levenberg | H04L 63/0807 726/7 |
| 2011/0302273 | A1* | 12/2011 | Pfitzmann | G06F 21/41 709/217 |
| 2011/0302412 | A1* | 12/2011 | Deng | H04L 63/0407 713/159 |
| 2012/0159577 | A1* | 6/2012 | Belinkiy | G06F 21/6218 726/4 |
| 2012/0166532 | A1 | 6/2012 | Juan et al. | |
| 2013/0042312 | A1* | 2/2013 | Wickman | H04L 63/08 726/7 |
| 2013/0124628 | A1* | 5/2013 | Weerasinghe | G06Q 50/01 709/204 |
| 2013/0173337 | A1* | 7/2013 | Evans | G06Q 30/0201 705/7.29 |
| 2013/0238745 | A1* | 9/2013 | Ramachandran | H04N 21/2396 709/217 |
| 2013/0275504 | A1* | 10/2013 | Patel | G06Q 10/10 709/204 |
| 2014/0059447 | A1* | 2/2014 | Berk | G06Q 10/10 715/751 |
| 2014/0059658 | A1* | 2/2014 | Stecher | G06F 21/45 726/5 |
| 2014/0059693 | A1* | 2/2014 | Stecher | H04L 63/0421 726/26 |
| 2014/0141720 | A1* | 5/2014 | Princen | H04L 63/0407 455/41.2 |
| 2014/0156360 | A1 | 6/2014 | Shalita et al. | |
| 2014/0156566 | A1 | 6/2014 | Kabiljo et al. | |
| 2014/0156744 | A1 | 6/2014 | Hua et al. | |
| 2015/0016799 | A1* | 1/2015 | Park | G06Q 10/10 386/224 |
| 2015/0193749 | A1* | 7/2015 | Ivanoff | G06Q 20/14 705/40 |
| 2015/0215288 | A1* | 7/2015 | Ramsaur | G06Q 10/10 726/28 |
| 2015/0332029 | A1* | 11/2015 | Coxe | H04L 63/0815 726/9 |
| 2015/0341340 | A1* | 11/2015 | Lu | H04L 9/3263 726/6 |
| 2015/0348015 | A1* | 12/2015 | Ren | G06Q 20/3226 705/41 |
| 2015/0356257 | A1* | 12/2015 | Wright | H04L 9/0643 705/51 |
| 2016/0014093 | A1* | 1/2016 | Kalb | H04L 63/08 726/4 |

\* cited by examiner

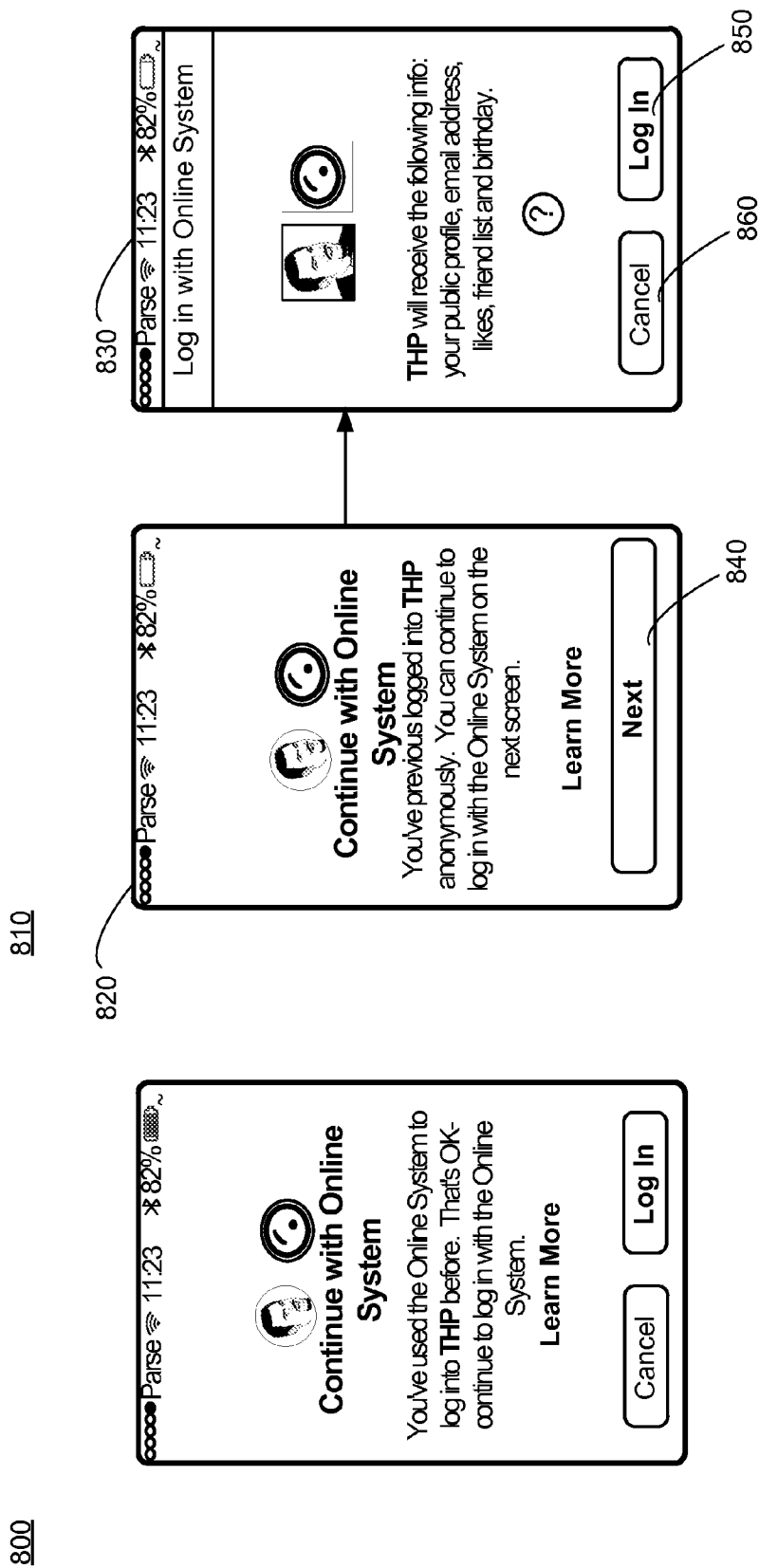

ANONYMOUS SINGLE SIGN-ON TO THIRD-PARTY SYSTEMS

BACKGROUND

This disclosure relates generally to anonymous single sign-on of users into third-party systems, and in particular to providing a graduated single sign-on functionality that controls what, if any, information about a user is provided to the third-party system.

Users of digital devices with online systems regularly login into third-party systems via associated third-party applications, and the third-party systems require their own login information distinct from the login information for the online system. This results in a user having to maintain separate login information for each system. Additionally, as part of obtaining login information for a particular third-party system, the third-party system generally requires a user to provide some amount of information about the user (e.g., name, email, etc.) before access to that third-party system is provided to the user. Thus, in order for users to try out a third-party application and/or associated third-party system they must provide information about themselves to the third-party system.

In some cases, a login provider may provide a single sign-on type capability into third-party systems, where a user of the login provider logs into the login provider which then interacts with the third-party application to log the user into the third-party system. Currently login providers that provide this type of single sign-on capability always provide the third-party system with some amount of information about the user (e.g., email, profile pic, friends list, etc.). Thus, there does not exist a way for a user to log into a third-party system without some user-identifying information about the user being provided to the third-party system either from the login provider or the user.

SUMMARY

An online system provides an anonymous single sign-on (ASSO) functionality for its users, in which a user can anonymously log into a third-party system using credentials provided by the online system. In some embodiments, when using the ASSO feature, a user may select an anonymous login option, in which the online system provides credentials to a third-party application associated with the third-party system without any of the user's personally identifiable information (PII), thus providing fully anonymous log in for the user into the third-party system. In other embodiments, when using the ASSO feature, a user may choose what types of the user's PII may be shared with the third-party application and/or third-party system, thus providing for a partially anonymous log in for the user into the third-party system. Additionally, in some embodiments, when using the ASSO feature, a user may create a persona and/or select a persona from one or more previously created personas that the online system can use to log the user into the third-party system. A user may configure each persona to specify what, if any, types of PII are shared with the third-party application and/or third-party system when the persona is used as part of the ASSO feature. Accordingly, the ASSO feature allows for a graduated approach to what, if any, of the user's PII is provided to the third-party application and/or third-party system.

When the user selects the anonymous login option from the third-party application, the application redirects the user to the online system. The online system generates a permissions user interface (UI) and provides the permissions UI to a client application (e.g., a browser, a single sign-on application for the online system, etc.) on the client device. The permissions UI obtains information from the user which is used to generate permissions information (e.g., some or all of the user's login information for the online system, what (if any) types of the user's PII may be shared with the third-party system, a selected persona, etc.). The permissions UI provides the permissions information to the online system. In some cases, the permissions UI is simply an interface from the online system that confirms that the user wishes to login anonymously to the third-party application, and the permissions information provided is the user's confirmation or selection of anonymous login via the online system permissions UI. The online system generates an anonymous identifier that allows the user to login to the third-party system, and provides the anonymous identifier to the third-party application to allow anonymous logging of the user into the third-party application without sharing any PII of the user with the third-party application and third-party system. The anonymous identifier provided by the online system is stable in that it does not change based on the client device of the user, but it is unique to the third-party application and/or the associated third-party system so that it provides no information about the user, allowing the user to be logged into the third-party system without providing any information (or even a password) to the third-party application and/or the third-party system.

In some embodiments, prior to generating the anonymous identifier, the online system generates an access token and provides it to the third-party application, which can use the access token to request the anonymous identifier of the user from the online system.

BRIEF DESCRIPTION OF THE DRAWINGS

FIG. 8A illustrates a permissions user interface prompting a user to log into a third-party application using an online system, according to an embodiment FIG. 8B illustrates another permissions user interface redirecting a user to log into a third-party application using an online system, according to an embodiment.

The figures depict various embodiments for purposes of illustration only. One skilled in the art will readily recognize from the following discussion that alternative embodiments of the structures and methods illustrated herein may be employed without departing from the principles of the disclosure described herein.

DETAILED DESCRIPTION

Overview

Figure 1:
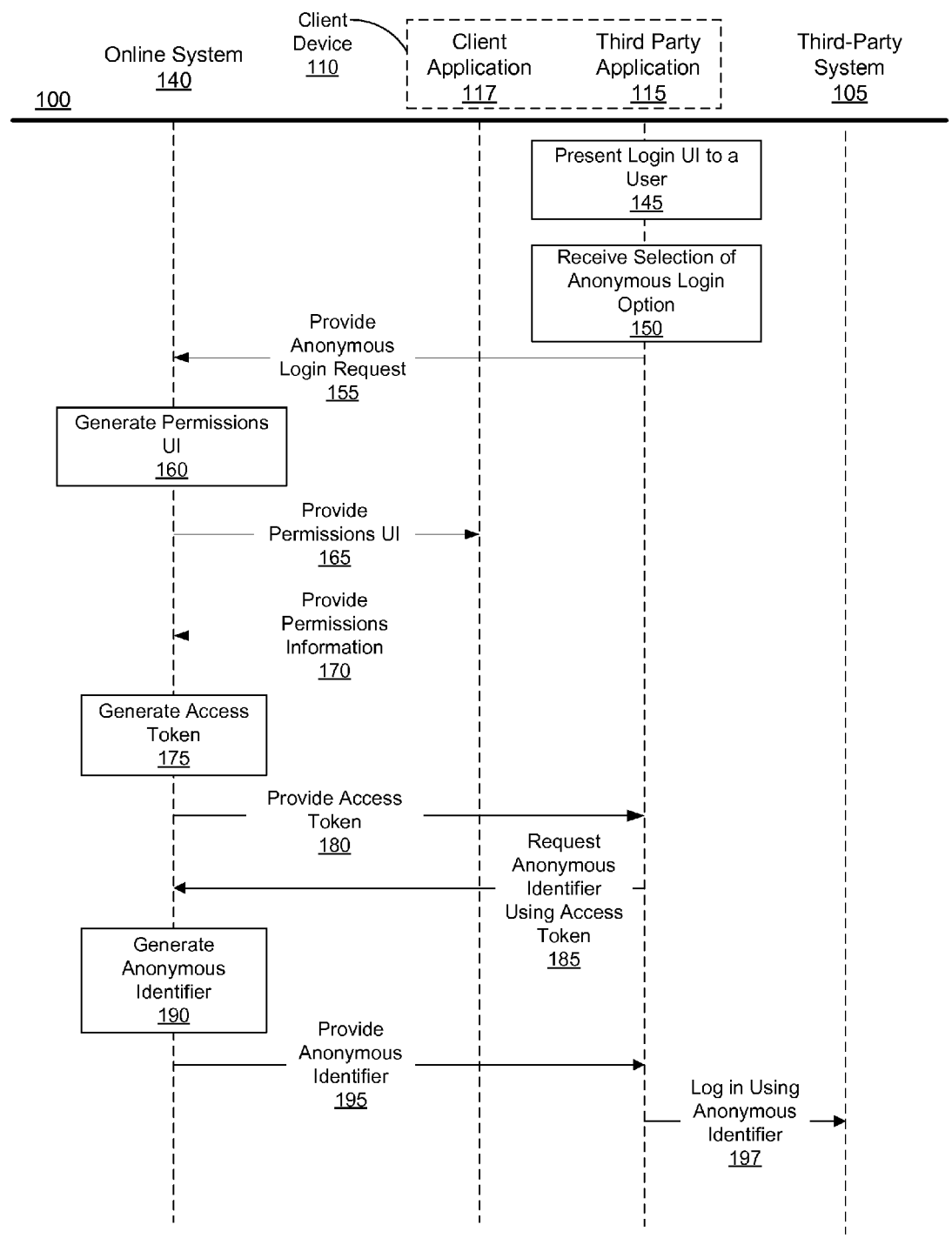
FIG. 1 is an interaction diagram of an example process for providing anonymous single sign-on login functionality to users of an online system into a third-party system, in accordance with an embodiment

FIG. 1 is an interaction diagram of an example process 100 for providing anonymous single sign-on login functionality to users of an online system 140 (e.g., a social networking system) into a third-party system 105. The process 100 includes a third-party application 115 operating on a client device 110 associated with a user of the online system 140. The third-party application 115 is an application that logs into the associated third-party system 105. In some embodiments, the third-party system 105 is an external entity that is separate from and external to the online system 140. Alternatively, the third-party system 105 may be part of the online system 140, but operates independent from the online system 140. For example the third-party system 105 has login information that differs from the login information of the online system 140 and the third-party system 105 only has access to PII of users of the online system 140 if the users and/or the online system 140 expressly share the PII with the third-party system 105.

The third-party application 115 presents 145 a login user interface (UI) to the user. The login UI prompts the user to select a login method from a plurality of different login method options. A login method is the method by which the user may be logged into the third-party system 105. The login method options presented to the user include an anonymous login option, and in some embodiments may also include a validated login option and/or or a direct login option.

The anonymous login option is a login option which provides the user with graduated single sign-on (ASSO) capability with respect to the third-party application 115. As discussed in detail below, ASSO allows a user to select what, if any, personally identifiable information (MI) about the user is shared with the third-party application 115 to login into the third-party system 105. PII is information that can be used on its own or with other information to identify, contact, or locate a single person, or to identify an individual in context. PII may be, e.g., the name of the user, address or email address of the user, public profile of the user, phone number of the user, user demographic information, user credit card information, user social information (e.g., comments, likes, connections, etc.), some other information that may be used to contact, identify, and/or locate the user; or some combination thereof.

A user is not anonymous when they log into third-party system 105 via the validated login option or direct login option. The validated login option corresponds to the traditional single sign-on functionality, where, if selected, a user enters some or all of their login information for the online system 140, and the online system 140 generates credentials that log the user into the third-party system 105. While the validated login option does provide single sign-on functionality, the user's PII is shared with the third-party application 105, and the validated login option does not provide the user with control over what portions of the user's PII are being shared with the third-party system 105. For example, in some instances, selection of the validated login option may allow the online system 140 to share all of the user's PII with the third-party application 105. The direct login option is a login option where the user logs directly into the third-party system 105 via the third-party application 115 using, e.g., a login and/or password specific to the third-party system 105.

The third-party application 115 receives 150 a selection of the anonymous login option. Responsive to the selection of the anonymous login option, the third-party application 115 provides 155 an anonymous login request to the online system 140.

Permissions information is the information received from the permissions UI that controls what, if any, of the user's PII may be shared with the third-party application 115 and/or the third-party application 105. Permissions information may include, e.g., a user's login information (e.g., user ID, password, etc.) for the online system 140; identify what, if any, personally identifiable information (PIT) of the user may be shared with the third-party application 115 and/or the third-party system 105; identify a login persona, identify an alternate login methodology (e.g., validated login option), or some combination thereof.

The online system 140 generates 160 a permissions user interface (UI). The permissions UI is a graphical user interface composed of at least one interface component that obtains and/or confirms the user's permissions information. The permissions UI may include, e.g., one or more interface components requesting the user's login information for the online system 140; one or more interface components allowing a user to select what, if any, PII may be shared with the third-party system 105; one or more interface components explaining a login method; one or more interface components allowing a user to create and/or select a login persona; or some combination thereof.

In some embodiments, the online system 140 generates interface components for the permissions UI based in part on whether the user is currently logged into the online system 140. For example, if the user is not already logged into the online system 140, the permissions UI may include an interface component that prompts the user for their login information for the online system 140. Additionally, in some embodiments, even if the user is already logged into the online system 140, the online system 140 may include an interface component in the permissions UI requesting the user provide a portion of their login information (e.g., password) for the online system 140 prior to continuing with anonymous login.

In some embodiments, online system 140 generates interface components for the permissions UI based in part on a number of times the online system 140 has received anonymous login requests associated with the user and the third-party application 115. For example, if the anonymous login request is the first such request received from the third-party application 115 for the user, the online system 140 may include one or more interface components that allow a user to choose what, if any, of the user's PII is provided to the third-party application 115. A user may elect to share no PII (fully anonymous login), some of their PII (partially anonymous login), or all of their PII with the third-party application 115 and/or the third-party system 105. In some embodiments, the interface components prompting for anonymous login result only in a fully anonymous login, and the user is not able to identify portions of their PII to share with the third-party application 115 and/or the third-party system 105. Additionally, in some embodiments, a permissions UI presented to a user using the ASSO for the first time may include specific interface components that explain the ASSO process. The permissions UI may include different interface components when the user uses the ASSO a second time. For example, the interface components may include less explanation of the process.

In some embodiments where the user had previously logged into the third-party system 105 using ASSO, the permissions UI may include one or more interface components that prompt the user to confirm and/or update what PII of the user may be shared with the third-party application 115 and/or third-party system 105.

In some embodiments, online system 140 generates interface components for the permissions UI based in part on whether the user had previously logged into the third-party application 115 using a validated login option. For example, if the user had previously logged into the third-party system 105 using a validated login option, the user's information would have been previously shared with the third-party application 115 and/or third-party system 105, thus, diminishing the value of ASSO. Accordingly, the permissions UI may include interface components that, e.g., notify the user that they have previously logged in using a validated login option, notify the user that ASSO is not available for the third-party application 115, provide a validated login option, or some combination thereof.

In some embodiments, the permissions UI may include an interface component that allows a user to create login personas and/or modify existing login personas. A login persona is a profile associated with the user that the online system 140 may use to anonymously log the user into the third-party system 105. Each login persona identifies what portions of the use's PII may be shared, and what portions of the user's PII may not be shared with the third-party application 115 and/or the third-party system 105. Additionally, a user is able to customize what portions of user PII are shared/not shared for each persona. For example, a user may create a first login persona that when used results is no user PII being shared with the third-party system 105, a second login persona that when used results in only the user's email being shared with the third-party system 105.

The online system 140 provides 165 the permissions UI to a client application 117 on the client device 110. The client application 117 may be, e.g., a browser, a single sign-on application for the online system 140, or an application that allows the online system 140 to exchange data with the client device 110 (e.g., a social networking application). Responsive to receiving permissions information from the user, the client application 117 provides 170 the permissions information to the online system 140.

The online system 140 generates 175 an access token. In some embodiments, the access token is information that is used by the third-party application 115 to request an identifier for the user. In alternate embodiments, the access token is an identifier which the third-party application 115 uses to anonymously log the user into the third-party system 105. The online system 140 stores the access token in a database (e.g., login database discussed below with reference to FIG. 2) that maps a user identifier associated with the user to the access token. In some embodiments, the database may also map the access token to an anonymous identifier associated with the user and the third-party application 115. The online system 140 provides 180 the access token to the third-party application 115.

In some embodiments, the third-party application 115 requests 185 an anonymous identifier for the user, the request including the access token. An anonymous identifier is a stable identifier (i.e., does not change based on the client device 110 associated with the user) that is unique to the third-party system 105, such that the third-party application 115 may use the anonymous identifier to log the user into the third-party system 105 without the online system 140 and/or the user providing information other than that specified by the permissions information to the third-party application 115 and/or an associated third-party system 105. In some embodiments, the user does not even need to provide a password to the third-party application 115 and/or the third-party system 105.

The online system 140 generates 190 the anonymous identifier using the access token. The online system 140 may generate the anonymous identifier by retrieving a previously generated anonymous identifier from the lookup table and/or creating a new anonymous identifier using the access token. The online system provides 195 the anonymous identifier to the third-party application 115, and the third-party application 115 uses 197 the anonymous identifier to log the user into the third-party system 105.

While the discussion above disclosed the online system 140 performing certain steps, in alternate embodiments, one or more of the steps performed by the online system 140 may be performed by the client application 117.

System Architecture

Figure 2:
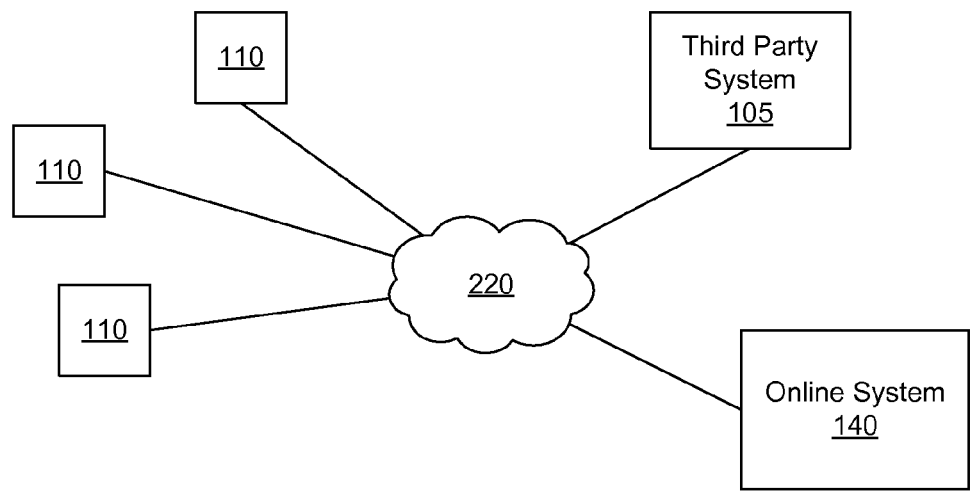
FIG. 2 is a block diagram of a system environment in which an online system operates, in accordance with an embodiment.

FIG. 2 is a high level block diagram of a system environment 200 for an online system 140. The system environment 200 shown by FIG. 2 comprises one or more client devices 110, a network 220, one or more third-party systems 105, and the online system 140. In alternative configurations, different and/or additional components may be included in the system environment 200. The embodiments described herein can be adapted to social networking systems that are not online systems.

The client devices 110 are one or more computing devices capable of receiving user input as well as transmitting and/or receiving data via the network 220. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 220. In one embodiment, a client device 110 executes an application allowing a user of the client device 110 to interact with the online system 140. For example, a client device 110 executes a browser application to enable interaction between the client device 110 and the online system 140 via the network 220. In another embodiment, a client device 110 interacts with the online system 140 through an application programming interface (API) running on a native operating system of the client device 110, such as IOS® or ANDROID™.

As discussed above, each client device 110 includes the client application 117 and the third-party application 115. As discussed above, the client application 117 may be, e.g., a browser, a single sign-on component of the online system 140, or an application that allows the online system 140 to exchange data with the client device 110 (e.g., a social networking application). The client application 117 presents a permissions UI to the user, and provides permissions information received from the user to the online system 140.

The third-party application 115 may be any application capable of presenting content to the client device user that is associated with a third-party system 105. For example, third-party application 115 may be a photo sharing application that receives content from the third-party system 105. The third-party application 115 is configured to present a login UI to the user. The login UI includes an anonymous login option that if selected, causes the third-party application 115 to send an anonymous login request to the online system 140. In some embodiments, the login UI may also include other login method options (e.g., direct login and/or validated login). The third-party application 115 is configured to use an access token to request an anonymous identifier that may be used to anonymously log in the user to the third-party system 105. In some embodiments, the third-party application 115 is configured to use the access token to anonymously log in the user to the third-party system 105. In some embodiments, the anonymous login option may be created using a software development kit (SDK). The online system 140 may make available the SDK software to software developers for third-party systems 105. The third-party application 115 is configured to provide some and/or all PII for a user received from, for example, the user and/or the online system 140 to the third-party system 105.

The client devices 110 are configured to communicate via the network 220, which may comprise any combination of local area and/or wide area networks, using both wired and/or wireless communication systems. In one embodiment, the network 220 uses standard communications technologies and/or protocols. For example, the network 220 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 220 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 220 may be encrypted using any suitable technique or techniques.

One or more third-party systems 105 may be coupled to the network 220 for communicating with the online system 140, which is further described below in conjunction with FIG. 3. The third-party system 105 is an entity that is external to and separate from the online system 140. Alternatively, the third-party system 105 may be part of the online system 140, but operates independent from the online system 140. In one embodiment, a third-party system 105 is an application provider communicating information describing applications (i.e., the third-party application 115) for execution by a client device 110 or communicating data to client devices 110 for use by the third-party application 115 executing on the client device 110. In other embodiments, a third-party system 105 provides content or other information for presentation via the third-party application 115. A third-party system 105 may also communicate information to the online system 140, such as advertisements, content, or information about the third-party application 115 provided by the third-party system 105. The third-party system 105 may receive portions of the user's PII in accordance with permissions information for users of the online system 140 from the online system 140, the third-party application 115, the users of the online system 140, or some combination thereof.

Figure 3:
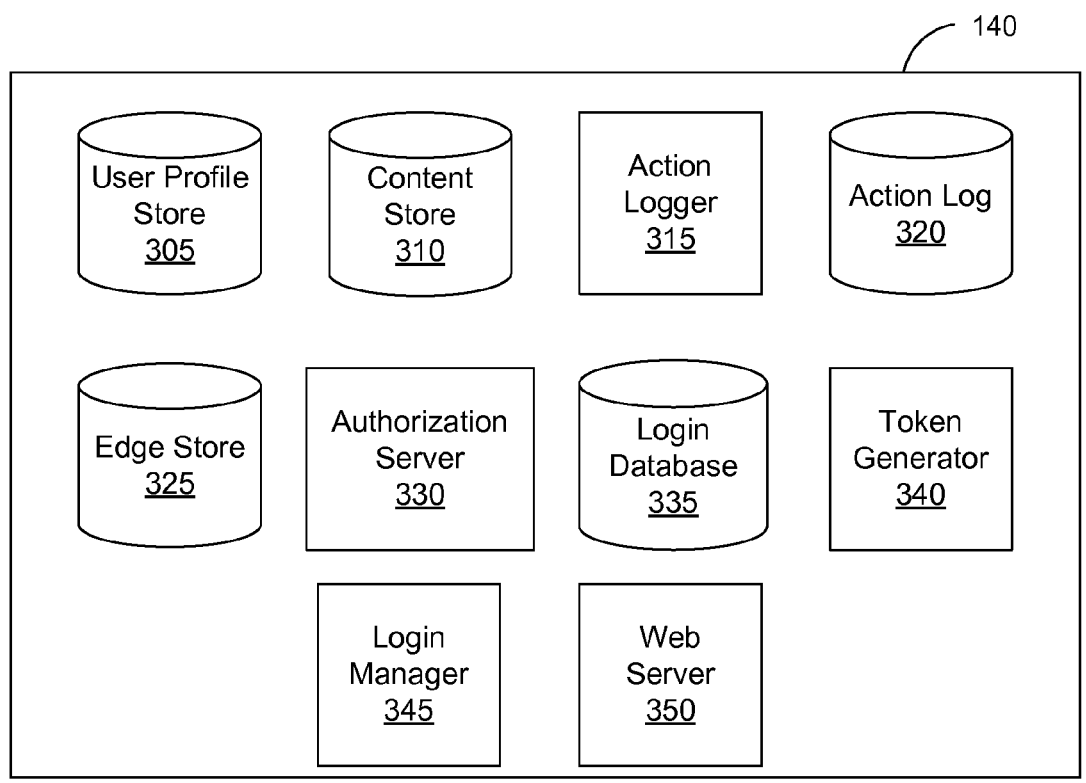
FIG. 3 is a block diagram of an online system, in accordance with an embodiment.

FIG. 3 is an example block diagram of an architecture of the online system 140. The online system 140 shown in FIG. 3 includes a user profile store 305, a content store 310, an action logger 315, an action log 320, an edge store 325, authorization server 330, a login database 335, a token generator 340, a login manager 345, and a web server 350. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding user of the online system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the online system 140 displayed in an image. A user profile in the user profile store 305 may also maintain references to actions by the corresponding user performed on content items in the content store 310 and stored in the action log 320.

While user profiles in the user profile store 305 are frequently associated with individuals, allowing individuals to interact with each other via the online system 140, user profiles may also be stored for entities such as businesses or organizations. This allows an entity to establish a presence on the online system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 310 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 310, such as status updates, photos tagged by users to be associated with other objects in the social networking system, events, groups or applications. In some embodiments, objects are received from third-party applications or third-party applications separate from the online system 140. In one embodiment, objects in the content store 310 represent single pieces of content, or content "items." Hence, users of the online system 140 are encouraged to communicate with each other by posting text and content items of various types of media through various communication channels. This increases the amount of interaction of users with each other and increases the frequency with which users interact within the online system 140.

The action logger 315 receives communications about user actions internal to and/or external to the online system 140, populating the action log 320 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 320.

The action log 320 may be used by the online system 140 to track user actions on the online system 140, as well as actions on third-party systems 105 that communicate information to the online system 140. Users may interact with various objects on the online system 140, and information describing these interactions are stored in the action log 310. Examples of interactions with objects include: commenting on posts, sharing links, and checking-in to physical locations via a mobile device, accessing content items, and any other interactions. Additional examples of interactions with objects on the online system 140 that are included in the action log 320 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 320 may record a user's interactions with advertisements on the online system 140 as well as with other applications operating on the online system 140. In some embodiments, data from the action log 320 is used to infer interests or preferences of a user, augmenting the interests included in the user's user profile and allowing a more complete understanding of user preferences.

The action log 320 may also store user actions taken on a third-party system 105, such as an external website, and communicated to the online system 140. For example, an e-commerce website that primarily sells sporting equipment at bargain prices may recognize a user of an online system 140 through a social plug-in enabling the e-commerce website to identify the user of the online system 140. Because users of the online system 140 are uniquely identifiable, e-commerce websites, such as this sporting equipment retailer, may communicate information about a user's actions outside of the online system 140 to the online system 140 for association with the user. Hence, the action log 320 may record information about actions users perform on a third-party system 105, including webpage viewing histories, advertisements that were engaged, purchases made, and other patterns from shopping and buying.

In one embodiment, an edge store 325 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the social networking system, sharing a link with other users of the social networking system, and commenting on posts made by other users of the social networking system.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 325 also stores information about edges, such as affinity scores for objects, interests, and other users. Affinity scores, or "affinities," may be computed by the online system 140 over time to approximate a user's affinity for an object, interest, and other users in the online system 140 based on the actions performed by the user. A user's affinity may be computed by the online system 140 over time to approximate a user's affinity for an object, interest, and other users in the online system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 325, in one embodiment. Alternatively, each interaction between a user and a specific object is stored as a separate edge. In some embodiments, connections between users may be stored in the user profile store 305, or the user profile store 305 may access the edge store 325 to determine connections between users.

As discussed above with reference to FIG. 1, PII is information that can be used on its own or with other information to identify, contact, or locate a single person, or to identify an individual in context. Thus, PII for a user may exist in different locations on the online system 140. For example, user profile information in the user profile store 305, information describing connections between the user and other users in the edge store 325, etc.

The authorization server 330 enforces one or more privacy settings of the users of the online system 140. A privacy setting of a user determines how particular information associated with a user can be shared, and may be stored in the user profile of a user in the user profile store 305 or stored in the authorization server 330 and associated with a user profile. In one embodiment, a privacy setting specifies particular information associated with a user and identifies the entity or entities with whom the specified information may be shared. Examples of entities with which information can be shared may include other users, client applications 117, third-party applications 115, third-party systems 105 or any entity that can potentially access the information. Examples of information that can be shared by a user include user profile information like profile photo, phone numbers associated with the user, user's connections, actions taken by the user such as adding a connection, changing user profile information and the like.

The privacy setting specification may be provided at different levels of granularity. In one embodiment, a privacy setting may identify specific information to be shared with other users. For example, the privacy setting identifies a work phone number or a specific set of related information, such as personal information including profile photo, home phone number, and status. Alternatively, the privacy setting may apply to all the information associated with the user.

The set of entities that can access particular information may also be specified at various levels of granularity. Various sets of entities with which information can be shared may include, for example, all users connected to the user, a set of users connected to the user, additional users connected to users connected to the user all applications, all third-party applications 115, specific third-party applications 115, all third-party systems 105, specific third-party systems 105, or all external systems.

The authorization server 330 receives anonymous login requests from third-party applications 115 operating on one or more client devices 110. For a given client device 110, the authorization server 330 determines if the user of the client device 110 is currently logged into the online system 140, and if not, may prompt the user for their login information for the online system 140. In some embodiments, the prompt may be part of the permissions UI.

The authorization server 330 generates a permissions UI including one or more interface components that obtains and/or confirms the user's permissions information. As discussed above with reference to FIG. 1, the permissions UI may include, e.g., an interface component requesting the user's login information for the online system 140; one or more interface components allowing a user to select what, if any, PII may be shared with the third-party system 105; one or more interface components providing information explaining the selected login method; one or more interface components allowing a user to create and/or select a login persona; or some combination thereof.

In some embodiments, authorization server 330 generates interface components for the permissions UI based in part on, e.g., whether the anonymous login request is the first received from the third-party application 115 for the user, the number of times the user had previously logged into the third-party system 105 using ASSO, whether the user had previously logged into the third-party application 115 using a validated login option, or some combination thereof. For example, a permission UI presented to a user using the ASSO for the first time may include specific interface components that explain the process.

In embodiments where the user had previously logged into the third-party system 105 using ASSO, the authorization server 330 may generate one or more interface components for the permissions UI that prompt the user to confirm and/or update what PII of the user may be shared with the third-party application 115 and/or third-party system 105. Additionally, if the user had previously logged into the third-party system 105 using a validated login option, the authorization server 330 may generates one or more interface components for the permissions UI that, e.g., notify the user that they have previously logged into the third-party system 105 using a validated login option, notify the user that ASSO is not available for the third-party system 105, provide a validated login option, or some combination thereof.

In some embodiments, the permissions UI may include an interface component that allows a user to create login personas and/or modify existing login personas. The interface component allows a user to customize what portions of user PII are shared/not shared for each persona.

The authorization server 330 generates a permissions UI based on how the user previously logged into the third-party system 105. The authorization server determines a number of times the online system 140 has received anonymous login requests associated with the user and the third-party application 115, whether the user previously logged into the third-party application 115 using the validated login method, what if any PII of the user has previously been shared with the third-party system 105, or some combination thereof. The authorization server 330 generates a permissions UI based on the above determination. For example, interface components may be different if this is the first time the user has requested the anonymous login option versus a user who has previously logged into the third-party application 115 via the anonymous login option.

The informational interfaces present content to the user relating to the user's selection of the anonymous login option. The authorization server 130 includes different informational interfaces in the permissions UI based on whether the anonymous login request is the first received from the third-party application 115 for the user, whether the user had previously logged into the third-party application 115 using ASSO, and whether the user had previously logged into the third-party application 115 using a validated login option. Examples of informational interfaces are discussed below with reference to FIGS. 5-7. The authorization server 130 is configured to provide the permissions UI to the client device 110.

In some embodiments, the authorization server 330 includes an interface component in the permissions UI to obtain from the user some or all of their login information for the online system 140, thus providing an extra layer of security.

The authorization server 130 receives permissions information from the client device 110. In some embodiments, the authorization server 130 is configured to update the login database 335 with the received permissions information (e.g., identifies what, if any, PII may be shared with the third-party system 105).

The login database 335 stores information used by the online system 140 to facilitate ASSO of its users into one or more third-party systems 105. The login database 335 may store, e.g., permissions information, portions of user PII, access tokens, anonymous identifiers, a number of times the online system 140 has received anonymous login requests associated with the user and the third-party application 115, information describing previous login methods of the user for a third-party system 105, information describing PII of the user that has previously been shared with the third-party system 105, or some combination thereof. In some embodiments, the stored permissions information is mapped to, e.g., a user ID, an access token, an anonymous identifier, or some combination thereof.

The token generator 340 generates access tokens. An access token is an opaque string that is unique and is associated with the user and the third-party application 115 and/or the third-party system 105. In some embodiments, the access tokens are only valid for a particular amount of time, after which, the access token expires. In some embodiments, the tokens are independent of the client device 110. Thus, a user may utilize an existing access token on multiple client devices 110 that have the third-party application 115. The token generator 340 stores generated access tokens in the login database 335.

In some embodiments, the token generator 340 determines if access tokens have been previously generated for third-party applications 115. For example, the token generator 340 may determine if an access token is available for a particular user and third-party application 115 and/or third-party system 105 using information in the login database 335. In embodiments where an access token is available, the token generator 340 may provide it to the requesting client device 110. Access tokens stored in the login database 335 that have expired are not valid, and thus may not be provided to the requesting client device 110. Accordingly, the token generator 340 generates a new access token 340, updates the login database 335 with the new access token, and provides the new access token to the requesting client device 110.

The login manager 345 manages requests for anonymous identifiers from third-party applications 115 operating on the client devices 110. For a given requesting third-party application 115, the login manager 345 generates an anonymous identifier.

The login manager 345 may generate the anonymous identifier by creating the anonymous identifier using an access token provided by the third-party application 115. The login manager 345 may create the anonymous identifier by, e.g., a random character generator, a one-way hash of some of the user's PII, a one-way hash of some of the user's PII combined with information identifying the third-party application 115 and/or the third-party system 105, one-way hash of some or all of the permissions information, some other technique to create a stable identifier, or some combination thereof. Additionally, in some embodiments, the login manager 345 may generate the anonymous identifier by retrieving a previously created anonymous identifier from the login database 335. The login manager 345 provides the anonymous identifier to the requesting third-party application 115 on the client device 110. In some embodiments, a previously generated anonymous identifier may be valid for a particular period of time (e.g., the duration of time associated with the access token). In embodiments, where the anonymous identifier retrieved from the login database 335 is not valid, the login manager 345 may, e.g., instruct the authorization server 330 to generate and provide a permissions UI to the client device 110 to re-validate the user's permissions information.

The web server 350 links the online system 140 via the network 220 to the one or more client devices 110, as well as to the one or more third-party systems 105. The web server 140 serves web pages, as well as other web-related content, such as JAVA®, FLASH®, XML and so forth. The web server 350 may receive and route messages between the online system 140 and the client device 110, for example, instant messages, queued messages (e.g., email), text messages, short message service (SMS) messages, or messages sent using any other suitable messaging technique. A user may send a request to the web server 350 to upload information (e.g., images or videos) that are stored in the content store 310. Additionally, the web server 350 may provide application programming interface (API) functionality to send data directly to native client device operating systems, such as IOS®, ANDROID™, WEBOS® or RIM®.

Method for Anonymous Single Sign-on for a Third-Party System

Figure 4:
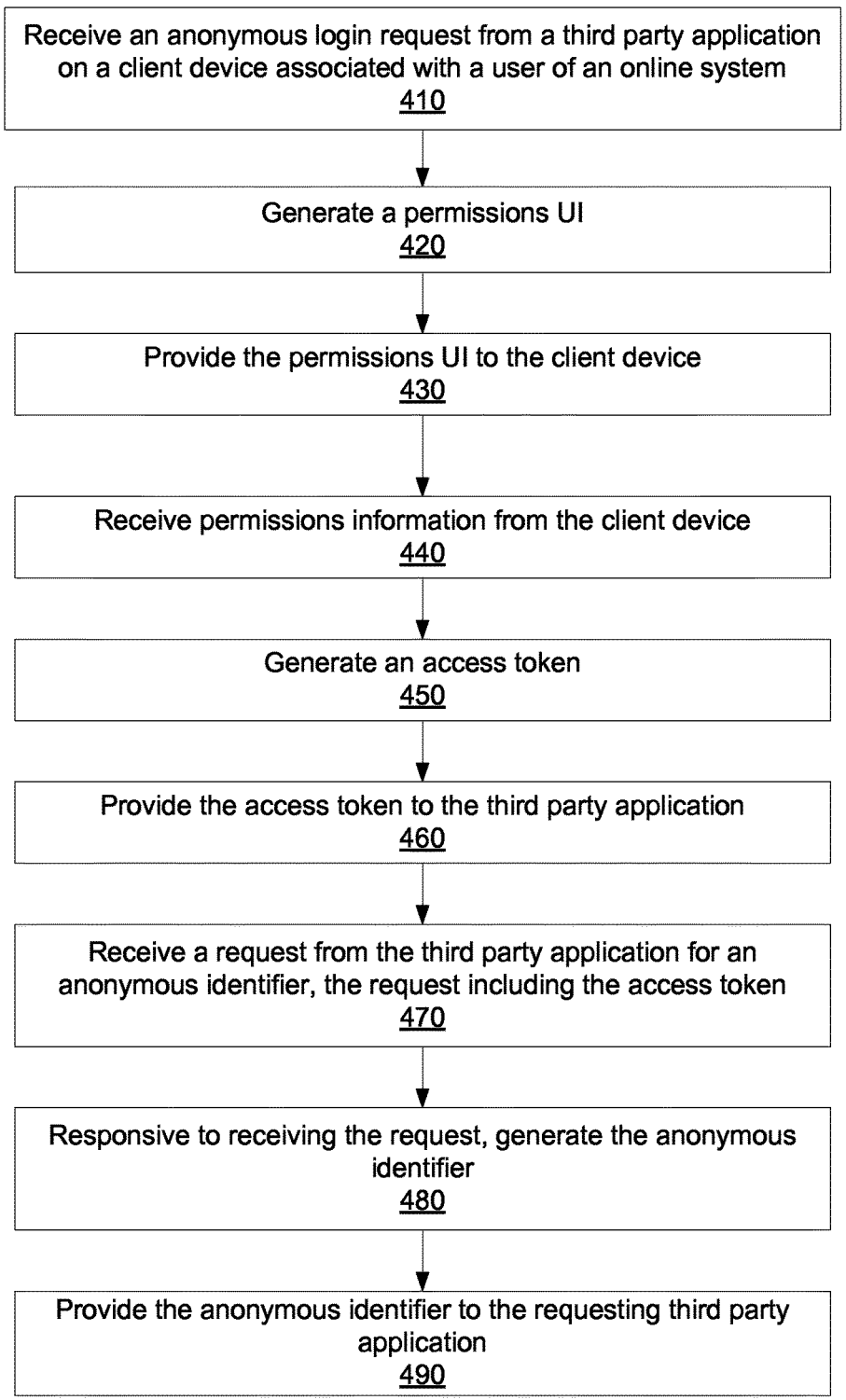
FIG. 4 is a flowchart illustrating a process for providing anonymous single sign-on functionality to users of an online system for logging into third-party systems according to an embodiment

FIG. 4 is a flowchart illustrating a process for providing anonymous single sign-on functionality to users of the online system 140 for logging into third-party systems 105 according to an embodiment. In one embodiment, the process of FIG. 4 is performed by the online system 140. However, in other embodiments, other entities may perform some or all of the steps of the process. Likewise, embodiments may include different and/or additional steps, or perform the steps in different orders.

The online system 140 receives an anonymous login request from a third-party application 115 located on a client device 110 associated with a user of the online system 140. Responsive to receiving the anonymous login request, the online system 140 generates 420 a permissions UI including one or more interface components. The interface components of the permissions UI are based in part on, e.g., whether the user is logged into the online system 140; whether the user previously logged into the third-party application 115 and, if so, whether the user logged in using an anonymous login option or a validated login option; what if any of the user's PII the user has previously elected to share with the third-party application 115 and/or third-party system 105, or some combination thereof. Additionally, in some embodiments, the permissions UI may include one or more interface components enabling a user to create and/or select a login persona.

In some embodiments, if the user is logged into the online system 140 when the anonymous login request is received, the permissions UI may include only a single interface component from which the user can complete anonymous login. This is discussed in detail below with regard to FIG. 6.

In some embodiments, the interface components may include several different login methods, for example, one interface component may allow a user to login fully anonymously, a second interface component may allow a user to log into the third-party system 105 while only sharing a particular portion of their PII with the third-party system 105, and third interface component may allow a user to log into the third-party system 105—but choose exactly what portions of their PII (if any) they are willing to share with the third-party system 105. Some examples of permissions UIs and interface components are discussed below with reference to FIGS. 5-8.

The online system 140 provides 430 the generated permissions UI to the client device 110. The client device 110 presents the permissions UI to the user via, e.g., a client application 117.

The online system 140 receives 440 permissions information from the permissions UI. The permissions information controls what, if any, PII the user has elected to allow the online system 140 to share with the third-party application 115 and/or the third-party system 105. For example, the permissions information may indicate that a user will only share their gender. In some cases, the permissions information may indicate that the user does not want any PII shared with the third-party application 115 and/or the third-party system 105.

Responsive to receiving the permissions information, the online system 140 generates 450 an access token. The generated access token is used by the third-party application 115 to request an anonymous identifier. The online system 140 may store the generated access token in database (e.g., login database 335). Additionally, in some embodiments, the generated access token may be valid only for a particular duration of time (e.g., 2 hours). The online system 140 provides 460 the access token to the third-party application 115.

The online system 140 receives 470 a request from the third-party application 115 for an anonymous identifier, the request including the access token. Responsive to receiving the request, the online system 140 generates 480 the anonymous identifier. For example, the online system 140 may retrieve a pre-existing anonymous identifier from a database using the received access token. Alternatively, the online system 140 may create the anonymous identifier. For example, the online system 140 may create the anonymous identifier by, e.g., taking a one way hash of some of the user's PII. The online system 140 provides 490 the anonymous identifier to the requesting third-party application 115.

In alternate embodiments, responsive to receiving permissions information from the client device 440, the online system 140 generates the anonymous identifier, and then provides the anonymous identifier to the client.

Figure 5:
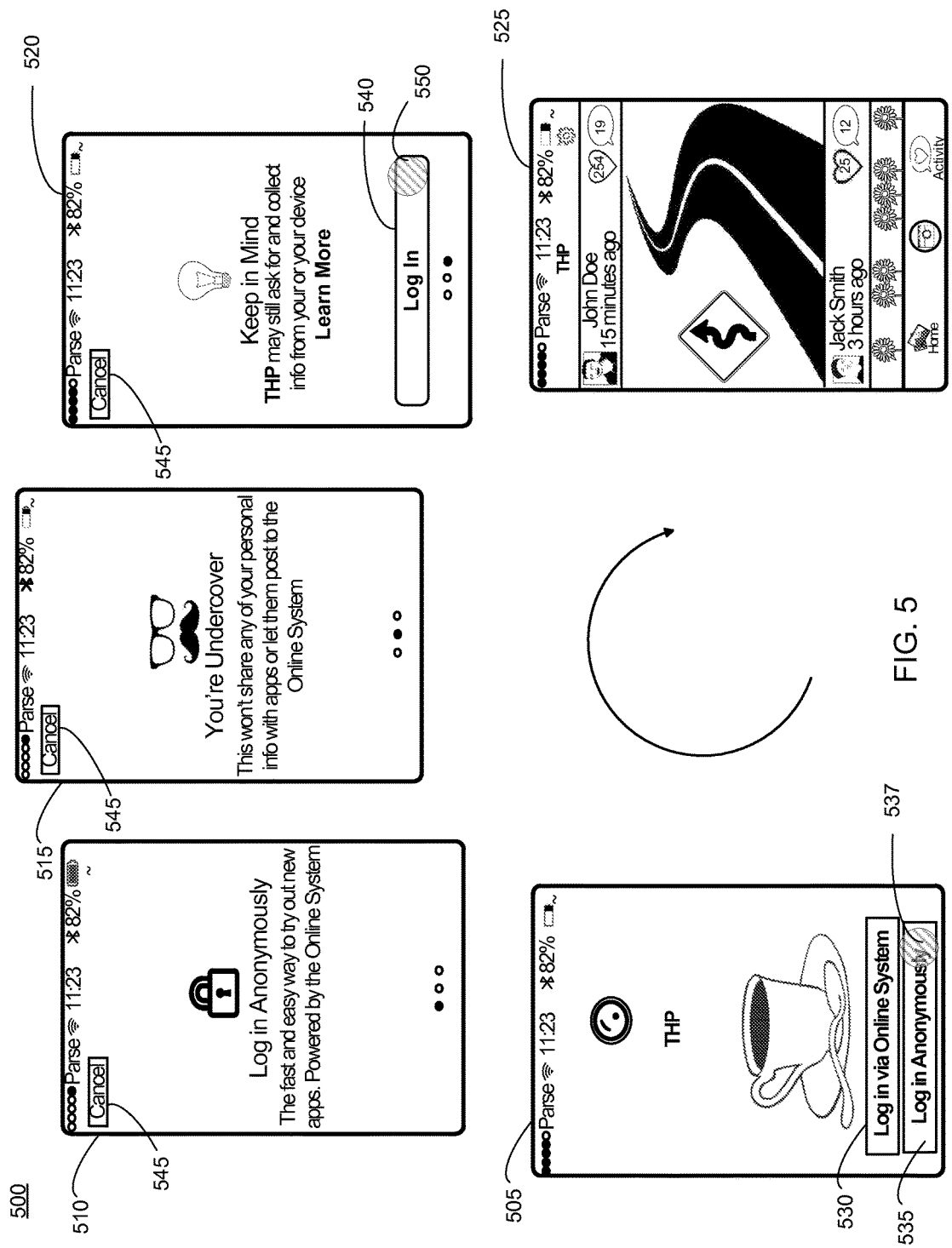
FIG. 5 illustrates a series of interfaces displayed to a user of a client device to provide fully anonymous login according to an embodiment.

FIG. 5 illustrates a series of interfaces 500 displayed to a user of the client device 100 to provide fully anonymous login according to an embodiment. The interfaces 500 include interfaces 505, 510, 515, 520, and 525. The interface 505 is an interface presented by the client device 100 if the user attempts to log into an application titled "THP" via the client device 100. The third-party application 115 presents, via the client device 100, the interface 505 prompting the user to select a login method. The interface 505 displays two login method options, specifically, "Log in via Online System" 530 (which is a validated login option) and "Log in Anonymously" 535 which is (which is an anonymous login option). If the user selects Log in via Online system 530, the user is logged in via the online system 140 and some of the user's PII may be shared with the third-party application 115 and/or an associated third-party system 105. In contrast, if the user selects Log in Anonymously 535 the user is electing to log into the third-party system 105 without sharing any PII with the third-party application 115 and/or an associated third-party system 105.

In response to the user selecting 537 the Log in Anonymously 535 login method option, the third-party application 115 generates an anonymous login request and sends it to the online system 140. The client device 110 receives a permissions UI from the online system 140. The permissions UI comprises interfaces 510, 515, and 520 (also may be referred to as interface components). Interfaces 510, 515, and 520 are informational interfaces that describe what it means to be logged in anonymously to the third-party system 105. For example, interface 510 introduces anonymous login as a way to try out new apps. In this embodiment, interface 515 explains that, in general, being logged in anonymously means no PII of the user is shared with the third-party applications and third-party applications will not be able to post any information to the online system 140. Interface 520 notes that the third-party application 115 may still solicit information from you and provides a "Log In" option 540 for user selection to complete the anonymous login of the user into the third-party system 105. The user may move from interface 510 to 515 by swiping horizontally from right to left on displayed interface, similarly, the user may move from interface 515 to 520 in a similar manner. Likewise a user may move from interface 520 to 515 and from interface 515 to 510 by swiping horizontally from left to right on the displayed interface. A user may exit the anonymous login process by selecting a "Cancel" button 545, selection of some button on the client device 100 that causes the user to exit the process, receipt of some other command from the user causing the user to exit the anonymous login process, etc. After the user has scrolled through the interfaces 510 and 515, the user completes the anonymous login process by selecting 550 the Log In button 540, causing the permissions UI to send permissions information to the online system 140.

As described above with respect to FIGS. 1 and 3, the online system 140 generates an access token, provides the access token to the third-party application 115 which the third-party application 115 uses to request an anonymous identifier for the user. The online system 140 generates the anonymous identifier and provides it to the third-party application 115. The third-party application 115 logs the user into the third-party system 105 as an anonymous user, and the third-party application 115 presents interface 525 to the user via the client device 100.

Figure 6:
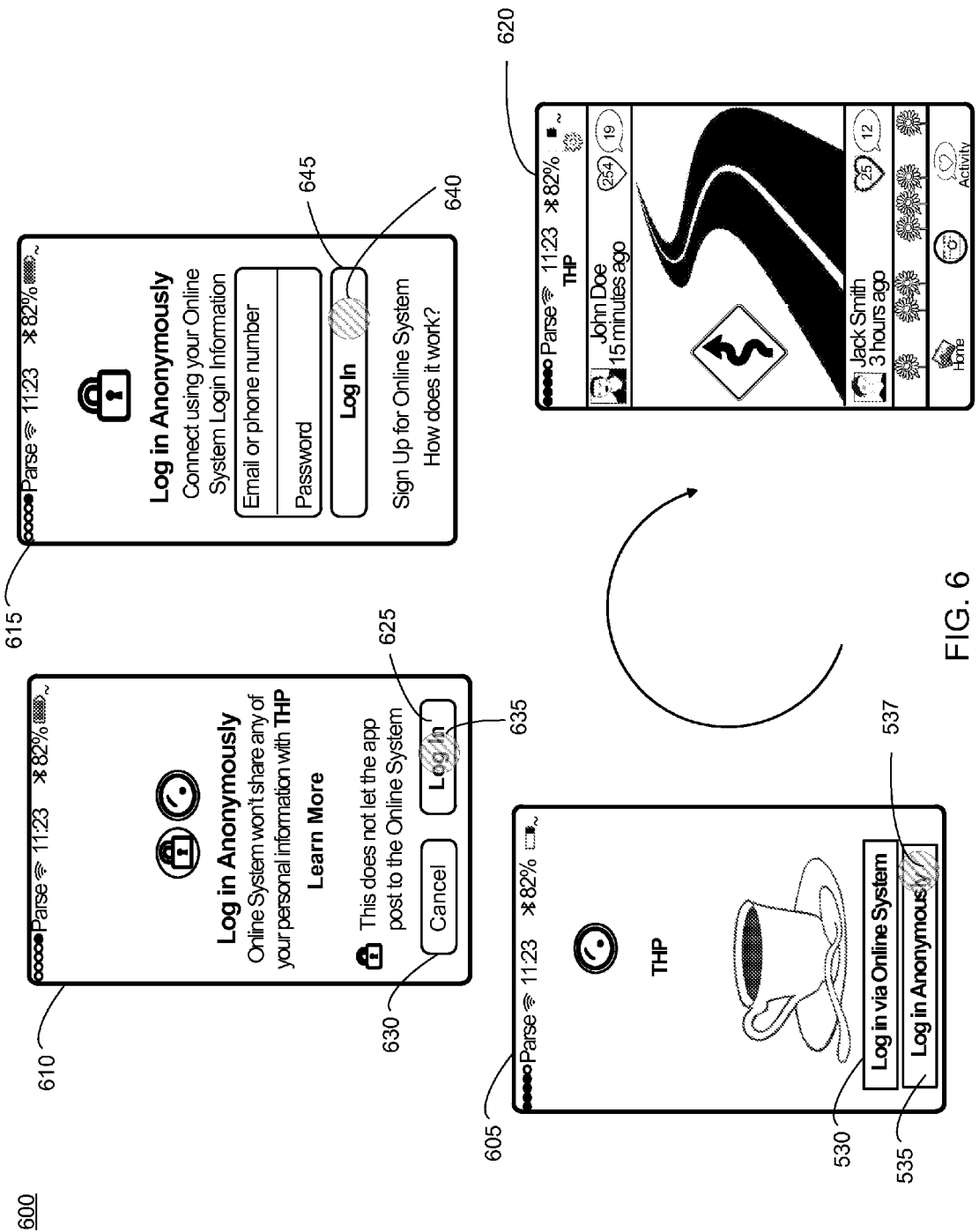
FIG. 6 illustrates another series of interfaces displayed to a user of the client device to provide fully anonymous login according to an embodiment.

FIG. 6 illustrates another series of interfaces 600 displayed to a user of the client device 100 to provide fully anonymous login according to an embodiment. The interfaces 600 include interfaces 605, 610, 615, and 620. The interface 605 is substantially similar to the interface 505 described above with regard to FIG. 5.

In response to the user selecting 537 the Log in Anonymously 535 login method option, the THP generates an anonymous login request and sends it to the online system 140, and a client device 110 receives a permissions UI from the online system 140. In this example, the permissions UI is presented by a client application 117 operating on the client device 110, and the permissions UI comprises interfaces 610 and 615.

In this embodiment, the permissions UI comprises fewer interfaces than, for example, the permissions UI described above with respect to FIG. 5. The interfaces 610 and 620 of FIG. 6 may be useful for cases where the user has previously logged into a third-party application 115 as an anonymous user and would be familiar with the effects of being logged into a third-party system 105 as an anonymous user. Additionally, in alternate embodiments, if a user is already logged into the online system 140, the permissions UI may only include interface 610. Thus, the three interfaces (510, 515, and 520) in FIG. 5 are replaced with two interfaces (610 and 615) or possibly even one interface 610. In this embodiment, interface 610 provides general description of what it means to log in anonymously and prompts the user to continue with anonymous login via selection of a "Log In" button 625 or cancelling the process via a "Cancel" button 630.

In this embodiment, responsive to a selection 635 of the Log In button 625 the client device 110 presents interface 615 prompting the user for their login information for the online system 140. This is a useful security measure as it helps ensure the user is the individual anonymously logging into the third-party system 105. After the user enters their login information for the online system 140 and selects 640 the "Log In" button 645, the permissions UI provides permissions information to the online system 140. In alternate embodiments, the interface 615 may be included only if the user is not currently logged into the online system 140.

As described above with respect to FIGS. 1, 3, and 5, logs the user into the third-party system 1-5 as an anonymous user, and the third-party application 115 presents interface 620 to the user via the client device 100.

Figure 7:
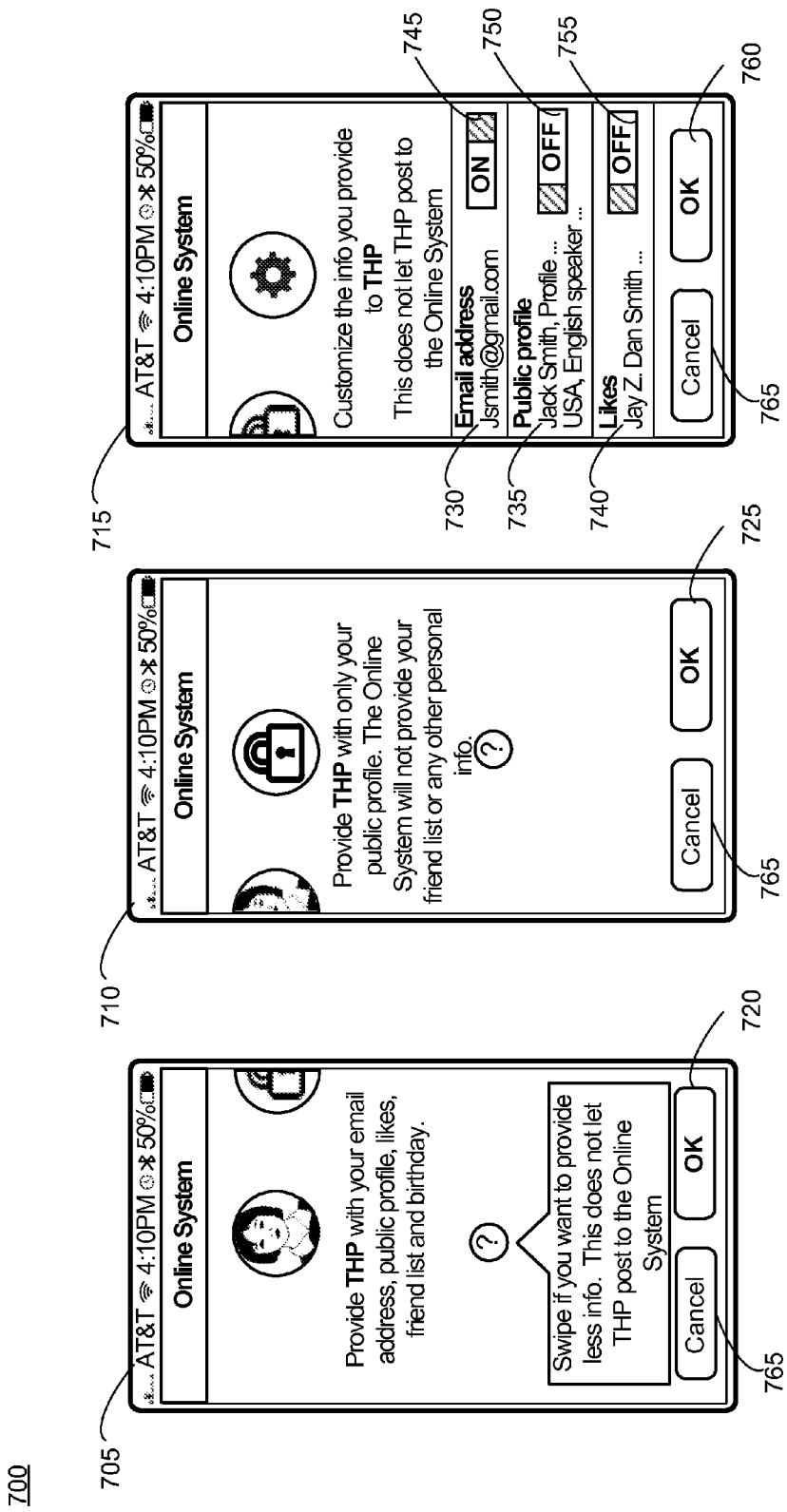
FIG. 7 illustrates a permissions user interface that provide graduated control of what personally identifiable information is provided to a third-party application, according to an embodiment.

FIG. 7 illustrates a permissions UI 700 that provide graduated control of what PII is provided to the third-party application 115, according to an embodiment. The permissions UI 700 includes interfaces 705, 710, and 715 that are presented by the client application 117 and allow a user to select what, if any, PII of the user be shared with the third-party system 105 and/or the third-party application 115.

Interface 705 presents an option for the user to log into the third-party system 105 via a validated login by selecting the "OK" button 720. As discussed above, a user selecting this option allows the online system 140 to share PII with the third-party system 105 and/or the third-party application 115.

Interface 710 presents an anonymous login option to the user that is pre-configured to allow the online system 140 share only specific PII relating to the public profile of the user with the third-party system 105 and/or the third-party application 115. Thus, a user may log into the third-party system 105 in a partially anonymous manner where some, but not all (i.e., their public profile), of their PII is shared with the third-party system 105 and/or the third-party application 115 via selection of the "OK" button 725.

Interface 715 presents an anonymous login option to the user that allows the user to select which items of their PII may be shared with the third-party system 105 and/or the third-party application 115. In this example, the interface 715 allows the user to elect to share or not share their email address information 730, their public profile information 735, and their likes 740. In alternate embodiments, the interface 715 may include additional and/or different PII which the user may elect to share and/or not share with the third-party system 105 and/or the third-party application 115. In this example, the user has elected to only share their email address information 730 via toggling the switch 745 to the ON position, while keeping the switches 750 and 755 in the OFF position. Accordingly, the interface 715 provides the user with graduated control over what PII may be shared with the third-party system 105 and/or the third-party application 115. In embodiments, where some, but not all, of the information is shared, the online system 140 logs the user into the third-party system 105 in a partially anonymous manner. Additionally, in embodiments, where the user chooses to not share any PII, the online system 140 logs the user into the third-party system 105 in a fully anonymous manner.

A user is able to navigate from interface 705 to 710 by swiping horizontally from right to left on displayed interface, similarly, the user may move from interface 710 to 715 in a similar manner. Likewise a user may move from interface 715 to 710 and from interface 710 to 705 by swiping horizontally from left to right on the displayed interface. A user is able to select a login option associated with the interface 705, 710, or 715, by selecting the OK button on that interface, specifically, the OK button 720, the OK button 725, or the OK button 760, respectively. Additionally, the user is able to exit the permission UI 700 by selecting any of the Cancel buttons 765.

Turning now to a discussion of embodiments where the online system 140 prevents a user from continuing with ASSO, FIGS. 8A and 8B show two specific cases. Such cases may be implemented to provide incentive to users to share some PII with third-party applications 115 which they are using regularly. Or, for example, such cases may inform the user that ASSO holds no benefit for the user for a particular third-party application 115, as the user may have previously logged into the third-party system 105 using a method that already shared the user's PII with the third-party application 115 and/or the third-party system 105. Additionally, such cases provide incentive for other third-party systems 105 to allow ASSO on their third-party applications 115.

In some embodiments, a user may select an anonymous login option, however, the permissions UI may not allow them to login anonymously. As noted above, the online system 140 generates the permissions UI based in part on how the user previously logged into the third-party system 105. In some embodiments, the user may have previously logged into the third-party system 105 via the validated login option, accordingly, the permissions UI may include an interface component notifying the user that they previously logged into the third-party system 105 and allow them to continue to log into the third-party system 105 in this manner and not via anonymous login. For example, FIG. 8A illustrates a permissions UI 800 prompting a user to log into a third-party application 115 using the online system 140, according to an embodiment. The permissions UI 800 allows the user to continue to login using the online system 140, but does not allow the user to anonymously log into the third-party application 115.

Additionally, in some embodiments, the online system 140 may allow the user to log into the third-party application 115 anonymously a specific number of times (e.g., one or more times). Once a particular threshold value is passed, the online system 140 may prohibit the user from anonymously logging into the third-party system 105, and prompt the user to log into the third-party system 105 using a validated login method. For example, FIG. 8B illustrates another permissions UI 810 redirecting a user to log into a third-party application 115 using the online system 140, according to an embodiment. In this example, the permissions UI 810 includes an interface component 820 that notifies the user that they have previously logged into the third-party system 105 anonymously, and indicates that they may log into the third-party system 105 via a validated login method. Responsive to a selection of the "Next" button 840, the permission UI 810 presents an interface component 830 to the user. In this example, the interface component 830 explains to the user that if they elect to continue, some of their user PII may be shared with the third-party application 115 and/or the third-party system 105. A user may continue the login by selecting the "Log In" button 850 or cancel the log in by selecting the "Cancel" button 860. Thus, the online system 140 is able to effectively limit the number of times a user is allowed to anonymously log in into a third-party system 115.

The online system 140 may infer that a user likes a particular third-party system 105 and/or third-party application 115 if the user continually requests anonymous login for the particular third-party system 105 and/or third-party application 115. In some embodiments, if a user has requested to log into the third-party system 105 anonymously, and has previously logged into the third-party system 105 anonymously one or more times, the online system 140 prompts the user to upgrade their login method. For example, the online system 140 may still allow the user to continue with anonymous login in the permissions UI, but also includes one or more options in the permissions UI that allow the user to alternatively log in as partially anonymous and/or via the validated login method. Thus, the online system 140 may attempt to upgrade the user into a login method where PII may be shared for third-party systems and/or third-party applications that the user appears to like.

In some embodiments, the online system 140 may monitor which third-party systems 105 and/or third-party applications 115 the user is currently anonymously logged into (fully and/or partially) or via the validated login method. The online system 140 identifies which third-party systems 105 and/or third-party applications 115 the user is logged into, and generates a dashboard graphical user interface that lists the identified third-party systems 105 and/or third-party applications 115. The online system 140 provides the dashboard to the client application 117 for presentation to the user. This allows the user to easily determine, e.g., what third-party systems 105 and/or third-party applications 115 they are logged into anonymously and what third-party systems 105 and/or third-party applications 115 they are logged into with the validated login method. In some embodiments, the listed third-party applications 115 are selectable, such that a user may select a listed third-party application 115 to bring the application to the foreground.

Summary

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A non-transitory computer-readable storage medium storing executable computer program instructions, the computer program instructions comprising instructions that when executed cause a computer processor to perform steps comprising:
   receiving, by an online system from a third-party application on a client device of a user, an indication that a user who is logging into the third party system associated with the third party application:
   (1) has selected an anonymous login option at a login page of the third party application that has a validated login option and the anonymous login option, and
   (2) has been redirected to the online system to implement the user's anonymous login request to anonymously log the user into the third party system, the third party system being external to and separate from the online system;
   responsive to receiving the anonymous login request, generating by the online system a permissions user interface ("UI") that provides an interface component including an option for the user to anonymously log into the third party system using the user's login information for the online system;
   providing the permissions UI to the client device, wherein responsive to input from the user, the permissions UI generates permissions information confirming that the user has requested to anonymously log into the third party system without the online system sharing any personally identifiable information ("PII") of the user with the third-party application and the third party system;
   responsive to receiving the permission information, generating an access token for the user to anonymously log into the third party system;
   providing the access token to the third-party application;
   receiving a request for an anonymous identifier from the third-party application, the request including the access token;
   generating, by the online system, an anonymous identifier that allows the user to login to the third party system, wherein the anonymous identifier is unique to the client device and to the third party system associated with the third party application such that the anonymous identifier can be re-used by the user to anonymously login to the third party application in the future; and
   providing the anonymous identifier to the third-party application to allow anonymous single sign-on of the user into the third party system in accordance with the permissions information.

2. The non-transitory computer-readable storage medium of claim 1, wherein generating the permissions UI further comprises:
   generating a second interface component that provides the user with an option to log into the third party system via a validated login option that shares the user's PII with the third-party application; and
   generating a third interface component that provides the user with an option to log into the third party system via an anonymous login option that shares some, but not all, of user's PII, with the third-party application.

3. The non-transitory computer-readable storage medium of claim 1, wherein the instructions, when executed, further cause a computer processor to perform steps comprising:
   identifying a plurality of third-party systems the user is logged into, the plurality of third-party systems including the third party system;
   generating a graphical user interface that lists the identified third-party systems; and
   providing the graphical user interface to the client device.

4. The non-transitory computer-readable storage medium of claim 3, wherein the identified plurality of third-party systems the user is logged into includes at least one third-party system that the user is logged into via a validated login option that shares the user's PII with the third-party application.

5. The non-transitory computer-readable storage medium of claim 1, wherein the instructions, when executed, further cause a computer processor to perform steps comprising:
receiving another anonymous login request from the third-party application on the client device;
determining that a number of times the online system has received anonymous login requests associated with the user and the third-party application is greater than a threshold value;
generating a second permissions UI that provides the user with an option to log into the third party system using the user's login information for the online system in a manner that shares some of the user's PII with the third-party application; and
providing the second permissions UI to the client device.

6. The non-transitory computer-readable storage medium of claim 1, wherein the instructions, when executed, further cause a computer processor to perform steps comprising:
receiving another anonymous login request from the third-party application on the client device;
determining that a number of times the online system has received anonymous login requests associated with the user and the third-party application is greater than a threshold value;
generating a second permissions UI that provides the user with an option to log into the third party system using the user's login information for the online system in a manner that shares some, but not all, of the user's PII with the third-party application; and
providing the second permissions UI to the client device.

7. A method comprising:
receiving, by an online system from a third-party application on a client device of a user, an indication that a user who is logging into the third party system associated with the third party application:
(1) has selected an anonymous login option at a login page of the third party application that has a validated login option and the anonymous login option, and
(2) has been redirected to the online system to implement the user's anonymous login request to anonymously log the user into the third party system, the third party system being external to and separate from the online system;
responsive to receiving the anonymous login request, generating by the online system a permissions user interface ("UI") that provides an interface component including an option for the user to anonymously log into the third party system using the user's login information for the online system;
providing the permissions UI to the client device, wherein responsive to input from the user, the permissions UI generates permissions information confirming that the user has requested to anonymously log into the third party system without the online system sharing any personally identifiable information ("PII") of the user with the third-party application and the third party system;
responsive to receiving the permission information, generating an access token for the user to anonymously log into the third party system;
providing the access token to the third-party application;
receiving a request for an anonymous identifier from the third-party application, the request including the access token;
generating, by the online system, an anonymous identifier that allows the user to login to the third party system, wherein the anonymous identifier is unique to the client device and to the third party system associated with the third party application such that the anonymous identifier can be re-used by the user to anonymously login to the third party application in the future; and
providing the anonymous identifier to the third-party application to allow anonymous single sign-on of the user into the third party system in accordance with the permissions information.

8. The method of claim 7, wherein generating the permissions UI further comprises:
generating a second interface component that provides the user with an option to log into the third party system via a validated login option that shares the user's PII with the third-party application; and
generating a third interface component that provides the user with an option to log into the third party system via an anonymous login option that shares some, but not all, of user's PII, with the third-party application.

9. The method of claim 7, further comprising:
identifying a plurality of third-party systems the user is logged into, the plurality of third-party systems including the third party system;
generating a graphical user interface that lists the identified third-party systems; and
providing the graphical user interface to the client device.

10. The method of claim 9, wherein the identified plurality of third-party systems the user is logged into includes at least one third-party system that the user is logged into via a validated login option that shares the user's PII with the third-party application.

11. The method of claim 7, further comprising:
receiving another anonymous login request from the third-party application on the client device;
determining that a number of times the online system has received anonymous login requests associated with the user and the third-party application is greater than a threshold value;
generating a second permissions UI that provides the user with an option to log into the third party system using the user's login information for the online system in a manner that shares some of the user's PII with the third-party application; and
providing the second permissions UI to the client device.

12. The method of claim 7, further comprising:
receiving another anonymous login request from the third-party application on the client device;
determining that a number of times the online system has received anonymous login requests associated with the user and the third-party application is greater than a threshold value;
generating a second permissions UI that provides the user with an option to log into the third party system using the user's login information for the online system in a manner that shares some, but not all, of the user's PII with the third-party application; and
providing the second permissions UI to the client device.

13. A system comprising:
a processor; and
a non-transitory computer-readable storage medium storing executable modules that when executed cause the processor to perform steps comprising:
receiving, by an online system from a third-party application on a client device of a user, an indication that a user who is logging into the third party system associated with the third party application:

(1) has selected an anonymous login option at a login page of the third party application that has a validated login option and the anonymous login option, and (2) has been redirected to the online system to implement the user's anonymous login request to anonymously log the user into the third party system, the third party system being external to and separate from the online system;

responsive to receiving the anonymous login request, generating by the online system a permissions user interface ("UI") that provides an interface component including an option for the user to anonymously log into the third party system using the user's login information for the online system;

providing the permissions UI to the client device, wherein responsive to input from the user, the permissions UI generates permissions information confirming that the user has requested to anonymously log into the third party system without the online system sharing any personally identifiable information ("PII") of the user with the third-party application and the third party system;

responsive to receiving the permission information, generating an access token for the user to anonymously log into the third party system;

providing the access token to the third-party application;

receiving a request for an anonymous identifier from the third-party application, the request including the access token;

generating, by the online system, an anonymous identifier that allows the user to login to the third party system, wherein the anonymous identifier is unique to the client device and to the third party system associated with the third party application such that the anonymous identifier can be re-used by the user to anonymously login to the third party application in the future; and providing the anonymous identifier to the third-party application to allow anonymous single sign-on of the user into the third party system in accordance with the permissions information.

14. The system of claim 13, wherein
generating the permissions UI further comprises generating a second interface component that provides the user with an option of selecting a login persona, of a plurality of login personas, wherein each persona identifies different types of the user's PII that are not shared with the third party system if the user elects to log into the third party system using that persona; and
the received permissions information identifies a login persona selected by the user, configured to share at least one type of PII with the third party system.

15. The system of claim 13, wherein generating the permissions UI further comprises:
generating a second interface component that provides the user with an option to log into the third party system via a validated login option that shares all types of the user's PII with the third-party application; and
generating a third interface component that provides the user with an option to log into the third party system via an anonymous login option that shares some, but not all, of user's PII, with the third-party application.

16. The system of claim 13, wherein the received permissions information indicates that no PII is to be shared with the third-party application.

17. The system of claim 13, wherein the received permissions information identifies at least one portion of the user's PII is to be shared with the third-party application, and wherein the executable modules when executed cause the processor to perform steps further comprising:
sharing the identified portion of the user's PII with the third-party application.

18. The system of claim 13, wherein the executable modules when executed cause the processor to perform steps further comprising:
receiving another anonymous login request from the third-party application on the client device;
determining that a number of times the online system has received anonymous login requests associated with the user and the third-party application is greater than a threshold value;
generating a second permissions UI that provides the user with an option to log into the third party system using the user's login information for the online system in a manner that shares some of the user's PII with the third-party application; and
providing the second permissions UI to the client device.

19. The system of claim 13, wherein the executable modules when executed cause the processor to perform steps further comprising:
identifying a plurality of third-party systems the user is logged into, the plurality of third-party systems including the third party system;
generating a graphical user interface that lists the identified third-party systems; and
providing the graphical user interface to the client device.

20. The system of claim 19, wherein the identified plurality of third-party systems the user is logged into includes at least one third-party system that the user is logged into via a validated login option that shares the user's PII with the third-party application.

21. The method of claim 7, wherein providing the anonymous identifier to the third-party application allows graduated single sign-on of the user into the third party system in accordance with the permissions information.

* * * * *